United States Patent [19]
Baum et al.

[11] 3,872,023
[45] Mar. 18, 1975

[54] MICROCAPSULES HAVING WALLS MADE OF COPOLYMER OF METHYLMETHACRYLATE AND ACETYLACETATES OF MONO(METH) ACRYLATES OF ALIPHATIC DIOLS

[75] Inventors: Guenter Baum, Ludwigshafen; Rudolf Bachmann, Frankenthal; Wolfgang Sliwka, Weinheim, all of Germany

[73] Assignee: Badische Anilin- & Fabrik Aktiengesellschaft, Ludwigshafen/Rhein, Germany

[22] Filed: Apr. 17, 1972

[21] Appl. No.: 244,929

[52] U.S. Cl............ 252/316, 8/79, 117/36.2, 117/62.2, 117/100 A, 117/161 UT, 252/314, 264/4, 424/33
[51] Int. Cl............................................. B01j 13/02
[58] Field of Search.. 252/316; 117/100 A, 161 UT; 424/33; 264/4

[56] References Cited
UNITED STATES PATENTS

| | | | |
|---|---|---|---|
| 3,016,308 | 1/1962 | Macaulay | 252/316 X |
| 3,069,370 | 12/1962 | Jensen et al. | 252/316 X |
| 3,336,155 | 8/1967 | Rowe | 252/316 X |
| 3,660,304 | 5/1972 | Matsukawa | 252/316 |
| 3,677,813 | 7/1972 | Eckert et al. | 117/161 UT X |

FOREIGN PATENTS OR APPLICATIONS

| | | | |
|---|---|---|---|
| 1,025,694 | 4/1966 | Great Britain | 117/100 A |

*Primary Examiner*—Richard D. Lovering
*Attorney, Agent, or Firm*—Johnston, Keil, Thompson & Shurtleff

[57] ABSTRACT

The invention relates to microcapsules having a wall material composed of optionally crosslinked copolymers comprising olefinically unsaturated monomers containing hydrophilic groups such as an acetylacetate of a mono(meth) acrylate of an aliphatic diol, and olefinically unsaturated monomers containing hydrophobic groups, such as methyl methacrylate, and a process for the manufacture of microcapsules.

3 Claims, No Drawings

MICROCAPSULES HAVING WALLS MADE OF COPOLYMER OF METHYLMETHACRYLATE AND ACETYLACETATES OF MONO(METH) ACRYLATES OF ALIPHATIC DIOLS

This invention relates to microcapsules having a wall material composed of an optionally crosslinked copolymer comprising from 3 to 80 percent by weight of olefinically unsaturated monomers containing hydrophilic groups and from 97 to 20 percent by weight of olefinically unsaturated monomers containing hydrophobic groups, in which up to 70 percent weight of the polymerized monomeric units in the copolymer contain crosslinkable reactive groupings.

A number of wall materials and methods of encapsulating a wide variety of materials in microcapsules is known.

Some of the known processes are characterized in that the polymeric wall material of the capsule must itself be formed during the manufacture of the microcapsules, for example by complex coacervation or by polymerization. This makes such processes very complicated and realizable only under very special conditions such as a narrow pH range or narrow temperature range. These processes are difficult to carry out continuously and it is also difficult to produce microcapsules having a substantially narrow size distribution.

There are other processes for the manufacture of microcapsules in which a suitable polymer is used direct for the formation of the wall of the capsule.

German Printed application No. 1,519,848 describes a process for the manufacture of microcapsules in which a film-forming hydrophobic polymeric wall material is precipitated, by cooling, onto the material to be encapsulated from a solution in an organic solvent, which also acts as carrier liquid, The materials to be encapsulated are solids and polar liquids which are immiscible with the organic carrier liquid. In this process, materials which are soluble in the same solvent as the wall material cannot be encapsulated. This process may be carried out only where specific solubility relationships hold and only with specific capsule wall materials and produces microcapsules having a size distribution spread out over a wide range.

German Printed application No. 1,444,402 describes a process for encapsulating water and aqueous solutions in which a film-forming polymeric material such as polystyrene is used in a water-immiscible solvent for the formation of the capsule wall. In this process, the first stage involves emulsification of the aqueous phase forming the core of the capsule in the organic solvent containing the wall-forming material, and this is followed by a second emulsification of the thus formed emulsion in an aqueous solution of a hydrophilic colloid. Formation of the capsule wall around the core material is effected externally by evaporating the solvent causing the capsule wall material to separate.

With this process and the wall materials used, the capsules obtained are not impermeable to the atmosphere. The process operates with large amounts of solvent and with from 50 to 70 percent (based on the material forming the core of the capsule) of capsule wall material and hydrophilic colloid. It is very difficult to control the final size of the capsule, on account of the double emulsification involved, and such control is usually only possible with certain losses of yield.

German Printed application No. 1,928,552 describes a method of making microcapsules in which a mixture of a high-boiling solvent as core material and a water-insoluble hydrophobic polymer as capsule-forming material in a low-boiling solvent is emulsified in water and the low-boiling solvent is then removed at elevated temperature. The wall materials stated in the cited printed application are not capable of providing well-formed microcapsules. Moreover, the permeability and strength of the microcapsule walls are unsatisfactory with the result that, when using microcapsules produced by said method and containing dyes for the manufacture of office duplication papers for example, it is not possible to produce papers which are stable on storage.

It is an object of the present invention to provide microcapsules having a wall material not showing the above drawbacks and to provide a process for encapsulating substances, which process produces, rapidly and in a simple manner, high yields of capsules having diameter from about $1\mu$ to 5 mm in substantially narrow size distributions.

This object is achieved by microcapsules having a wall material composed of an optionally crosslinked copolymer of A. from 3 to 80 percent by weight of olefinically unsaturated monomers containing hydrophilic groups and B. from 97 to 20 percent by weight of olefinically unsaturated monomers containing hydrophobic groups, in which up to 70 percent by weight of the polymerized monomeric units in the copolymer contain crosslinkable reactive groupings.

The microcapsules of the invention may be manufactured by forming a mixture of the core material, a polymeric capsule wall material, a volatile water-immiscible organic solvent and a water-miscible organic solvent and dispersing this solution in an aqueous carrier liquid and separating the capsule wall material from the dispersed phase at the phase interface by evaporating the solvent.

In contrast with other processes, the process of the present invention involves the separation of the polymeric wall material from the dispersed phase at the phase interface to form a capsule wall.

The microcapsules of the invention are produced with a copolymeric wall material prepared from (A) 3 to 80 percent by weight of monomers containing hydrophilic groups and (B) 97 to 20 percent by weight of monomers containing hydrophobic groups, the total mixture of (A) + (B) containing up to 70 percent by weight of crosslinkable monomers. Thus the wall material is composed of copolymers in which the monomeric units contain hydrophilic and hydrophobic groups. The monomers bearing hydrophilic groups are monomers which contain, in particular, polar groups such as carboxyl, sulfonic acid, carbonamide, dialkylamino, hydroxyl and N-methylol. The monomers bearing hydrophobic groups are monomers which contain less polar or non-polar groups such as esters or aromatic radicals, in particular phenyl.

As examples of suitable hydrophilic-group-bearing monomers or monomers which are water-soluble after salt formation there may be mentioned acrylic acid, methacrylic acid, crotonic acid, itaconic acid, maleic acid, acrylamide, methacrylamide, N-methylolacrylamide, glycol monoacrylate, butanediol monoacrylate, diethylaminoethyl acrylate, vinyl pyrrolidone, 2-vinyl-4-dimethyloxazoline, 2-sulfoethyl methacrylate, 2-sulfopropyl methacrylate and vinylsulfonic acid.

The preferred hydrophilic-group-bearing monomers for the formation of the wall material are, in particular, acrylic acid compounds such as acrylic acid, methacrylic acid, acrylamide, vinyl pyrrolidone and 2-sulfoethyl methacrylate.

The amount of hydrophilic monomeric units present in the copolymeric wall material is conveniently from 3 to 80 percent by weight, based on the total amount of wall-forming copolymer. The nature and amount of the hydrophilic units in the copolymeric wall material governs the solubility properties of the wall material, the dispersibility and thus the size of the capsules formed. It may be particularly advantageous to include a number of monomers containing different hydrophilic groups.

Convenient hydrophobic monomers are (meth)acrylates containing from 1 to 9 carbon atoms in the alcohol moiety, such as methyl acrylate, t-butyl acrylate and methyl methacrylate, vinyl esters of aliphatic monocarboxylic acids containing from 2 to 18 carbon atoms, such as vinyl acetate, vinyl propionate and vinyl pivalate, and olefinically unsaturated hydrocarbons containing an optionally substituted benzene ring, such as styrene, vinyl toluene and α-methylstyrene. These monomers influence the solubility in organic solvents and, in particular, the hardness of the wall material. The hydrophobic monomers are advantageously incorporated in the copolymer in amounts of from 97 to 20 percent by weight. The particularly preferred hydrophobic monomer is methyl methacrylate.

When formed, a capsule shell should possess adequate strength and hardness and should not be soluble either in the aqueous carrier liquid or in the material forming the core of the capsule. In general, diffusion of the contents of the capsule through the capsule shell is undesirable, although limited permeability may be desired in special cases.

In order to increase the mechanical strength properties and to reduce greatly the permeability of the capsule shell to the encapsulated materials, it is advantageous to use a wall material consisting of copolymers containing crosslinkable reactive groupings such that the copolymers may be chemically cured or crosslinked. Subsequent crosslinking or curing of the copolymers via these reactive groupings, as may be carried out in known manner, modifies the properties of the wall material, particularly as regards solubility, swellability, hardness and permeability, to suit the various applications.

The crosslinkable reactive groupings may be incorporated in the copolymer in the form of components of the hydrophilic or hydrophobic monomers to be copolymerized, i.e., the comonomers used are such that the resulting polymerized units in the copolymers also contain or can form crosslinkable reactive groups, e.g., by copolymerization of acrylamide, methacrylamide, glycol acrylate, 1,4-butanediol monoacrylate, N-methylolacrylamide, N-methylolacrylamide-butyl ether and 2-dimethylaminoethyl acrylate.

The incorporation of crosslinkable reactive groupings into the copolymer is effected particularly well by copolymerizing olefinically unsaturated monomers containing methylene groups activated by one or two carbonyl groups, for example copolymerizing acetyl acetates of copolymerizable hydroxyl group-containing olefinically unsaturated monomers or of diacetone acrylamide, in an amount of up to 50 percent and in particular of from 5 to 40 percent by weight of the total amount of copolymer-forming monomers. Very suitable monomers for this purpose are the acetyl acetates of monoesters of aliphatic diols of from 2 to 8 carbon atoms with olefinically unsaturated carboxylic acids of from 3 to 5 carbon atoms, such as butanediol-1-acrylate-4-acetyl acetate, ethyleneglycol-1-methacrylate-2-acetyl acetate and diethyleneglycolacrylateacetyl acetate.

The reactive groups of the resulting copolymers may be crosslinked with for example polyvalent metal ions to form complexes. They also react in known manner with diamines, hydrazines and, particularly readily, with aldehydes. Under suitable conditions, chemical curing may be effected with formaldehyde at room temperature to produce very strong capsules having an impervious shell.

In the case of copolymers containing crosslinkable reactive groupings such as are obtained by copolymerizing, say, N-methylol acrylamide, N-methylol methacrylamide or their esters with alcohols, chemical curing generally proceeds very slowly at temperatures below 100°C for which reason it is sometimes convenient to operate under pressure.

Particularly suitable wall materials are copolymers which are sparingly soluble in water and in the core material and which are composed of from 20 to 50 percent by weight of methyl methacrylate as hydrophobic monomer, from 20 to 50 percent by weight of acetyl acetates of mono (meth)acrylates of aliphatic diols of from 2 to 8 carbon atoms and from 0 to 30 percent by weight of acrylamide, 0 to 30 percent by weight of acrylic acid, 0 to 30 percent by weight of vinyl pyrrolidone and 0 to 3 percent by weight of 2-sulfoethyl methacrylate.

The preparation of the wall-forming copolymer is carried out by conventional polymerization methods. It is preferred to employ solution polymerization, advantageously in solvents such as lower alcohols, ketones or ethers which do not interfere with the process of the invention for the manufacture of microcapsules so that, if desired, the solution of wall material obtained in the polymerization may be used in the present process.

The copolymers used for forming the wall material usually have K values ranging from 10 to 50 as measured by the method proposed by H. Fikentscher in Cellulosechemie 13 (1932) pp. 58 et seq.

The copolymeric wall material is dissolved in a water-immiscible and volatile organic solvent. Suitable volatile water-immiscible solvents are those which have boiling points below 100°C and which are readily removed by distillation, by introduction of steam or inert gas such as air or nitrogen, or by reducing the pressure. Suitable solvents are, for example, chlorinated aliphatic hydrocarbons, particularly methylene chloride, chloroform, carbon tetrachloride, and alkanoic acid esters such as ethyl acetate.

Dispersion in the aqueous carrier liquid is greatly facilitated by adding water-miscible solvents conveniently having boiling points below 100°C. Convenient solvents for this purpose are lower aliphatic alcohols, ketones and ethers, for example methanol, ethanol, propanol and, preferably, isopropanol, but also acetone and tetrahydrofuran. These solvents facilitate dispersion and may in some cases replace the addition of an emulsifier such as polyvinyl pyrrolidone. They are added in quantities ranging from 10 to 400 percent by weight of the weight of the wall-forming material.

For encapsulation of a material it is desirable that said material be soluble in the volatile organic solvent used in the solution of the wall material and is adequately insoluble in water, i.e., that it is divided between the organic and aqueous phases in a favorable ratio. Naturally, the material to be encapsulated should be less volatile than the volatile solvent used.

As examples of the large number of possible core-forming substances there may be mentioned castor oil, sperm oil, olive oil, paraffins and waxes, chloroparaffins, chlorinated diphenyl, light naphtha, kerosene, dibutyl phthalate, tricresyl phosphate, hydrocarbons, benzene, toluene, xylene, ethylhexyl acrylate, n-butyl acrylate, t-butyl acrylate, lauryl acrylate and styrene. In these materials there may be dissolved or dispersed polymers, adhesives, dyes, perfumes, fuels, initiators, chemical reagents, inks, plasticizers or perfumes. The contents of the capsules may also be solid materials such as pigments and polymers. Preferred core materials are reactive dyes dissolved in organic solvents.

The organic phase containing the dissolved wall-forming and coreforming materials is dispersed in an aqueous carrier liquid. The carrier liquid is water usually containing protective colloids such as polyvinyl pyrrolidone, polyvinyl alcohols, cellulose derivatives such as carboxymethyl cellulose, hydroxyethyl cellulose, hydroxymethyl cellulose, salts of polyacrylic acid, polyacrylamides, sodium salts of copolymers of acrylic acid and/or maleic acid or their half-esters with vinyl compounds.

Some or all of said protective colloid may be replaced by other dispersing agents such as anionic emulsifiers, alkali metal salts of fatty acids such as stearic, lauric, oleic and abietic acids, salts of acid fatty alcohol/sulfuric acid esters and salts of paraffinsulfonic acids. Also, non-ionic emulsifiers may be used, for example glycerol monostearate, sorbitol monolaurate, polyoxyethylene ethers of fatty alcohols and aromatic hydroxyl compounds.

When suitable water-miscible solvents are added, it is possible to effect dispersion without any addition of dispersing or emulsifying agents, in which case the capsules are produced in pure water.

The special characteristic of the process for the manufacture of microcapsules of the invention is the fact that the polymeric wall material separates from the dispersed phase at the phase interface in the course of dispersion and evaporation of the volatile solvent.

The process substantially consists of three steps:
1. dispersion in the aqueous carrier liquid of the mixture containing the core-forming material and the wall-forming material in a volatile water-immiscible organic solvent and a water-miscible organic solvent,
2. evaporation of the volatile solvents and formation of the capsule wall,
3. optional chemical curing or crosslinking of the capsule walls followed by isolation of the resulting microcapsules.

Dispersion is advantageously carried out by stirring the organic phase in the aqueous carrier liquid until the desired particle size and distribution has been attained. The degree of dispersion and size distribution may be readily observed under the microscope and, if necessary, corrected. If desired, the solution of the wall-forming material and the solution of the core-forming material may be added to the aqueous phase separately.

Usually, the aqueous carrier liquid contains an emulsifier or dispersing agent dissolved therein. Particularly suitable are polyvinyl pyrrolidones added in amounts of from 0 to 30 percent by weight based on the solids content of the final dispersion.

The particle size of the microcapsules and their size distribution may be controlled by suitable selection of the type and amount of the solvents and protective colloids used.

The size of the microcapsules and their size distribution and thus their technological properties may be further influenced by the type of dispersing apparatus used, the dispersing energy applied and the method of feeding the solutions to the dispersing operation. It should be noted that for a given ratio of wall-forming material to core-forming material, the resulting wall thickness diminishes as the size of the capsules decreases, due to the changing surface-to-volume ratio. A decrease in the wall thickness is accompanied by an increase in permeability of the capsule wall.

The size of the capsules and their size distribution may be controlled by various means. For example, control may be effected at the dispersion stage within wide limits by varying the dispersing energy, by selecting different solvents or dispersing agents or varying the quantities thereof used, and possibly by adding salts. It is not difficult to produce capsules having sizes ranging from $1-100\mu$ up to diameters of about 5 mm.

A general rule to be observed when selecting dispersing apparatus is that the size of the capsules diminishes as the shear applied to the dispersion is increased. Apparatus which may be advantageously used for the production of microcapsules includes flat-blade mixers, cage-type stirrers, high-speed stirrers, colloid mills, homogenizers, supersonic dispersers, etc. The type of dispersing apparatus used also influences the particle size distribution.

The nature and amount of solvent and dispersing agent used influence the size of the capsules and control the amount of possible agglomeration.

A general rule is that, at constant dispersing energy, the size of the capsules diminishes as the amount of volatile water-immiscible and/or water-miscible organic solvent is increased and the amount and quality of the protective colloids or dispersing agents are raised. The ratio of the solvent-containing phase to the aqueous phase is also a controlling factor. The particle size distribution is affected by varying the quantities used.

Another way of influencing the capsule size is to use protective colloids of different molecular weights within one type. For example, when using polyvinyl pyrrolidone having a K-value of 90 and polyvinyl pyrrolidone having a K-value of 30, larger capsules may be obtained by using larger amounts of the polyvinyl pyrrolidone of lower molecular weight.

Yet another way of controlling the capsule size is to add water-soluble inorganic salts such as sodium sulfate and sodium pyrophosphate before dispersion is commenced. The addition of salts generally provides larger capsules, very small capsules being fused to units of two or more capsules forming one new capsule.

The structure and molecular weight of the wall-forming material is also an important factor influencing the size of the capsules. The capsules. The capsules diminish in size the more hydrophilic the wall material is. The capsule size may be regulated by combining hydrophilic wall material with less hydrophilic wall material. This method of control is particularly simple when using polymers containing carboxyl groups or dialkylamino groups. The addition of bases or acids to these polymers prior to dispersion partly or completely neutralizes said polymers to alter their hydrophilic characteristics within wide limits.

To produce a solid capsule wall, the readily volatile water-insoluble solvents for the polymeric wall material are removed. The conditions are adapted to suit the type of solvent and the polymers such as the core-forming material. Since solvents having a boiling point below that of water are used, these are readily removed by distillation, introduction of steam, air or nitrogen or by reducing the pressure, at temperatures of between, say, 20° and 95°C. When removing the solvent, it is advantageous to stir the dispersion and control the temperature in such a manner that it slowly rises to the boiling point of the solvent and, when the solvent has been removed, rises above the boiling point of the solvent to ensure that residual solvent is removed and any pores in the capsule walls are closed by fusion of the polymer. The time taken for this evaporating process is governed by the amount and vapor pressure of the solvent, the dimensions of the reaction vessels and the temperature. The water-miscible organic solvents may be removed, but this is not essential in all cases.

Following the removal of the solvents, the resulting capsules may be hardened by chemical curing. Curing is effected, for example, by reacting the polymerized units of crosslinkable activated groupings (see above) with hydrazine, diamines or aldehydes. It is very advantageous to carry out curing with formaldehyde, this being possible at room temperature, although it may be accelerated by using elevated temperatures and if desired by using accelerators such as tertiary amines, e.g., tributylamine, or p-toluenesulfonic acid. To effect curing, the capsule suspension is mixed with an appropriate amount of aqueous formaldehyde solution and, for example, stirred for 30 minutes at elevated temperature (80°C). On completion of the crosslinking reaction, the resulting microcapsules may be used in the form of the suspension obtained or they may be separated from the aqueous carrier liquid by filtration, centrifuging, settling or creaming, and then dried to free-flowing powders by conventional methods.

The process conditions of the invention are highly suitable for the continuous manufacture of microcapsules. To this end, the mixture of core material, wall material and solvent is continuously fed to a disperser and the resulting dispersion is diluted with a little water if necessary and then passed through a heated column or a falling film evaporator or an apparatus as used for example for the continuous removal of residual monomers, for the continuous removal of the solvent. A simple heated stirred vessel provided with a metering device and discharge means is connected to the evaporator downstream thereof. The curing agent, for example aqueous formaldehyde solution, is fed to the suspension in said stirred vessel, optionally at elevated temperatures (up to 95°C). Since the chemical curing process proceeds very quickly at elevated temperature, the residence time in said stirred vessel is short and the final capsule suspension may be discharged via cooling means without it being necessary for the suspension to be held in a second stirred vessel for completion of the curing step. It is worthy of note that the size of the capsules may be controlled in the continuous production of the capsules using the raw materials described as well as in the batchwise process.

The advantages of the wall material and encapsulating process of the invention reside in the smoothness of operation, good reproducibility, high yields, narrow size limits, i.e., simplicity of maintaining a narrow particle size distribution, omission of timeconsuming and complicated filtration, which, if required, is simply and speedily carried out, and the broad range of applications and economy of time as compared with other processes. The distillation presents no special problems.

The microcapsules of the invention are preferably used as dyecontaining microcapsules in reactive duplication papers.

In the following examples the parts and percentages are by weight unless otherwise stated. The K-values given are determined by the method proposed by H. Fikentscher in Cellulosechemie 13 (1932) pp. 58 et.seq.

EXAMPLE 1

Preparation of copolymer for wall material 500 parts of a mixture which consists of 600 parts of butanediol monoacrylate acetyl acetate, 592.5 parts of methyl methacrylate, 300 parts of acrylamide, 1,500 parts of isopropanol, 5 parts of diazobutyronitrile and 7.5 parts of 2-sulfoethyl methacrylate and which has been neutralized to pH 4 with 10 percent sodium hydroxide solution, are placed in a stirred flask immersed in a tempering bath, and the mixture is heated to 80°C. 15 minutes after polymerization has commenced, the remainder of the mixture is added at from 80° to 85°C over 60 minutes. Polymerization is completed over 270 minutes at 80°C, and the resulting solution is cooled and diluted to a solids content of 40 percent by the addition 750 parts of chloroform. The solution is turbid and pale yellow in color. The K-value of the polymer, after dilution of the solution with chloroform to a solids content of 1 percent, is 24.0.

Preparation of dispersion

In a glass beaker having a capacity of 800 parts by volume and equipped with an ULTRA-TURRAX T 45 stirrer (manufactured by Jahnke & Kunkel), there are placed 200 parts of water, 50 parts of a 10 percent solution of polyvinyl pyrrolidone having a K-value of 90 and 0.2 part of p-toluenesulfonic acid, and this mixture is stirred at 10,000 r.p.m. There is then added, over about 2 minutes, a solution of 180 parts of trichloromethane, 60 parts of the 40 percent solution of wall material, 50 parts of tricresyl phosphate and 0.5 part of tributylamine. Emulsification is stopped after a further 2 minutes and there is obtained a stable dispersion.

Distillation and curing

In a stirred flask having a capacity of 2,000 parts by volume and equipped with a flat-blade stirrer (120 r.p.m.) and a descending condenser there are placed 300 parts of water and 50 parts of a 10 percent polyvinyl pyrrolidone solution, which mixture is heated to 35° to 40°C. The above dispersion is then added over from 5 to 10 minutes. Over the next 2 hours, the dichloromethane and isopropanol are evaporated off, the temperature rising from 40° to 80°C, whereupon 10 parts of a 40 percent formaldehyde solution are added dropwise over 10 minutes and the temperature is maintained at 70°C for a further hour before the mixture is cooled.

There is obtained a capsule dispersion containing individual capsules of which the major portion has diameters of from 2 to 4$\mu$. The capsules may be easily isolated by filtration followed by drying.

In order to test the success of the encapsulation, the dispersion is brushed onto an absorbent paper. After evaporation of the water, there is obtained a non-staining coating, this showing that all of the tricresyl phosphate has been encapsulated. If the layer of capsules is damaged by pressure with a hard object, staining occurs at the points where pressure was applied, this being due to tricresyl phosphate penetrating the paper.

If the process is repeated using 50 parts of dibutyl phthalate in place of the tricresyl phosphate, there are obtained capsules having an average diameter of from 2 to 4$\mu$.

If the process is repeated using 50 parts of 2-ethylhexyl acrylate as core material and stabilizing with 0.2 part of anthraquinone, there are obtained capsules having an average diameter of from 10 to 15$\mu$.

The use of 50 parts of isooctane in place of tricresyl phosphate produces capsules having an average diameter of 4$\mu$.

The use of 50 parts of xylene in place of tricresyl phosphate provides capsules having an average diameter of 4$\mu$.

The use of 50 parts of cyclohexanone in place of tricresyl phosphate gives capsules having an average diameter of from 4 to 5$\mu$.

EXAMPLE 2

Example 1 is repeated except that the liquid to be encapsulated is fed to the stirred distilling mixture of water and polyvinyl pyrrolidone and is not mixed with the solution of the wall-forming material. In this way impervious capsules are obtained having a considerably larger average diameter, this being from 50 to 100$\mu$ in the encapsulation of tricresyl phosphate, 70$\mu$ in the case of dibutyl phthalate, 50$\mu$ in the case of stabilized ethylhexyl acrylate and about 50$\mu$ in the case of isooctane.

EXAMPLE 3

In a glass flask having a capacity of 5,000 parts by volume and equipped with an ULTRA-TURRAX T 45 stirrer there are stirred 1,445 parts of water at 10,000 r.p.m. while a mixture of 3.6 parts of tributylamine, 1,350 parts of chloroform, 174 parts of isopropanol, 650 parts of chlorinated diphenyl, 144.5 parts of naphtha (b.p. 155°–185°C) and 433 parts of the 40 percent wall-forming polymer solution prepared in Example 1 is added over 30 minutes. After a further 10 minutes, 1.4 parts of p-toluenesulfonic acid in 60 parts of water are stirred in over 10 minutes, and the emulsion is removed from the flask. One third of the resulting emulsion is placed, for distillation of the solvent, in a stirred flask having a capacity of 5,000 parts by volume and equipped with an anchor agitator (120 r.p.m.), where it is mixed with 1,082 parts of water and the solvents are removed by distillation as described in Example 1.

The capsules are cured by adding 30 parts of 40 percent formaldehyde solution.

There is obtained a dispersion in which the capsules have a diameter of from 6 to 20$\mu$, mostly 12$\mu$. A coating of the capsules dispersion on absorbent paper shows, after storage for 8 days at 95°C, no loss of weight of the encapsulated chlorinated diphenyl and naphtha.

EXAMPLE 4

An apparatus for continuous operation consists of an ULTRA-TURRAX stirrer arranged in a continuous-flow vessel having two inlets and an overflow outlet, a small stirred mixing vessel having a single inlet, which is connected to the outlet of the continuous-flow vessel, and a single outlet, which is connected to a descending condenser coil which leads to a curing vessel followed by a collecting vessel, from which the final dispersion can be removed. The condenser coil is heated and serves to drive off the solvent, which distils off at the top of the coil and condenses in a descending condenser.

A solution of 885 parts of water, 15 parts of polyvinyl pyrrolidone and 0.6 part of p-toluenesulfonic acid is passed continuously through one of the inlets of the continuous-flow vessel containing the ULTRA-TURRAX stirrer (10,000 r.p.m.) over 1.5 hours. Through the other inlet there is passed a solution of 7.2 parts of 3,3-bis(p-dimethylamino)-6-dimethylaminophthalide, 2 parts of tributylamine, 550 parts of dichloromethane, 270 parts of trichlorodiphenyl, 30 parts of naphtha (b.p. 155°–185°C) and 180 parts of the solution of wall material as prepared in Example 1, so that this solution is dispersed in the first solution. The dispersion overflows into the mixing vessel, where it is evenly mixed with a solution of 1,035 parts of water and 15 parts of polyvinyl pyrrolidone having a K-value of 90. The resulting mixture passes through the condenser coil, which is externally heated at from 85° to 90°C, the solvent being removed and condensed in the descending condenser above the condenser coil. To the curing vessel there are added, over the same period, 30 parts of a 40 percent formaldehyde, solution, the temperature being maintained at from 80° to 85°C for curing the capsule walls. The dispersion overflows from the curing vessel into the cooled collecting vessel.

There is thus obtained a dispersion of microcapsules of which the major portion has a diameter of about 4$\mu$. The remaining portion has diameters of from 2 to 8$\mu$.

EXAMPLE 5

Operating as described in Example 1, there is added to a solution of 345 parts of water and 5 parts of polyvinyl pyrrolidone a solution of 2.4 parts of 3,3-bis(dimethylamino)-6-dimethylaminophthalide, 0.6 part of N-benzoylleucomethylene blue, 0.5 part of tributylamine, 180 parts of chloroform, 90 parts of trichlorodiphenyl, 10 parts of naphtha (b.p. 155°–185°C) and 60 parts of the 40 percent solution of wall material used in Example 1. The resulting dispersion is mixed with a solution of 295 parts of water, 5 parts of polyvinyl pyrrolidone (K-value 90) and 0.2 part of p-toluenesulfonic acid, after which the solvents are distilled and the capsules cured. The resulting dispersion contains capsules having a diameter of about 8$\mu$. By using different solvents and amounts thereof and different amounts of wall material, the following changes in the particle size of the capsules are observed:

| No. | Quant. (parts) | Solvent | Quantity of 40% soln. of wall material (parts) | Average diameter of capsules |
|---|---|---|---|---|
| 5a | 180 | chloroform | 60 | 8μ |
| 5b | 180 | chloroform | 50 | 8 to 10μ |
| 5c | 150 | chloroform | 50 | 10 to 12μ |
| 5d | 180 | chloroform | 40 | 8μ |
| 5e | 140 | chloroform | 40 | 12μ |
| 5f | 150 | dichloromethane | 60 | 4 to 5μ |
| 5g | 180 | dichloromethane | 60 | 4μ |
| 5h | 150 | dichloromethane | 50 | 4 to 5μ |
| 5i | 180 | dichloromethane | 50 | 3μ |
| 5j | 150 | dichloromethane | 40 | 5 to 6μ |

It is readily seen from the above that the capsule diameter is influenced by the amount and nature of the solvent used at constant dispersing energy.

EXAMPLE 6

560 parts of methyl methacrylate are polymerized with 210 parts of acrylic acid, 630 parts of butanediol monoacrylate acetyl acetate, 0.2 part of t-dodecyl mercaptan and 14 parts of diazoisobutyronitrile in 600 parts of isopropanol at from 80° to 85°C. There is obtained a polymer having a K-value of 32.9 (as measured in chloroform).

The method described in Example 2 is used for dispersing a solution of 100 parts of trichlorodiphenyl, 4 parts of 3,3-bis-(p-dimethylamino)-6-dimethylaminophthalide, 1 part of N-benzoylleucomethylene blue, 200 parts of chloroform, 80 parts of the above 70 percent solution of wall material and 0.5 part of tributylamine in 200 parts of water, 2 parts of 10 percent sodium hydroxide solution and 3 parts of a 50 percent solution of the sodium salt or a reaction product of oleic acid amide with N-methylcyclohexylamine, which has been sulfonated. After evaporation of the organic solvent there is obtained a dispersion containing capsules having diameters of from 3 to 6μ.

The trichlorodiphenyl and the two dyes encapsulated in this Example may be replaced by 100 parts of naphtha (b.p. 155°–185°C) as core material. There is then obtained a capsule dispersion containing capsules of from 6 to 8μ in diameter.

EXAMPLE 7

A solution of 400 parts of dichloromethane, 150 parts of dodecyl acrylate, 2.5 parts of benzoyl peroxide, 1 part of t-butyl perpivalate, 0.5 part of tributylamine and 50 parts of the 40 percent solution of wall-forming copolymer prepared in Example 1 is dispersed in a solution of 5 parts of polyvinyl pyrrolidone in 595 parts of water in conventional manner using a TURRAX stirrer. The solvent is completely removed over 3 hours at from 40° to 70°C, whereupon 25 parts of 40 percent formaldehyde solution are added over 15 minutes and curing and polymerization are completed over 1 hour at from 70° to 80°C.

There is obtained a dispersion containing capsules having a diameter of about 25μ. These capsules may be obtained by filtration and drying. There is obtained a free-flowing powdery material which, on destruction of the capsules for example by pressure, acts as an adhesive.

EXAMPLE 8

A wall material is obtained by polymerizing 200 parts of butanediol monoacrylate acetyl acetate, 100 parts of vinyl pyrrolidone, 100 parts of methyl methacrylate, 100 parts of acrylamide and 5 parts of diazoisobutyronitrile in 500 parts of isopropanol. The resulting 50 percent solution solidifies to a white mass in the cold, but is soluble in chloroform. When diluted with chloroform to a solids content of 1 percent, the polymer has a K-value of 39.

An emulsion is formed in conventional manner from a solution of 100 parts of trichlorodiphenyl, 2.4 parts of 3,3-bis(p-dimethylamino)-6-dimethylaminophthalide, 0.6 parts of N-benzoylleucomethylene blue, 200 parts of chloroform, 60 parts of the above 50 percent solution of wall-forming polymer and 1 part of tributylamine and, as continuous phase, a solution of 245 parts of water and 5 parts of polyvinyl pyrrolidone (K-value 90). The emulsion is mixed with a solution of 345 parts of water and 5 parts of polyvinyl pyrrolidone having a K-value of 90 and the solvent is removed before curing is carried out with 10 parts of 40 percent formaldehyde solution followed by cooling.

There is obtained a dispersion which does not contain individual capsules but agglomerates of capsules. The agglomerates have a diameter of from 15 to 60μ.

EXAMPLE 9

In the manner described above, a dispersion is formed from 95 parts of trichlorodiphenyl, 5 parts of naphtha (b.p. 155°–185°C), 2.4 parts of 3,3-bis(p-dimethylamino)-6-dimethylaminophthalide, 0.6 part of N-benzoylleucomethylene blue, 50 parts of the 40 percent solution of wall-forming polymer from Example 1, 10 parts of the 70 percent solution of wall-forming polymer from Example 6, 0.5 part of tributylamine and 200 parts of chloroform and, as continuous phase, a solution of 245 parts of water, 3 parts of polyvinyl pyrrolidone having a K-value of 90 and 2 parts of polyvinyl pyrrolidone having a K-value of 30. The emulsion is added to a solution of 345 parts of water and 5 parts of polyvinyl pyrrolidone having a K-value of 90. The solvent is distilled off and curing is effected with 10 parts of 40 percent formaldehyde solution followed by cooling. There is obtained a capsule dispersion having capsules of from 2 to 4μ in diameter, no capsules being retained by a sieve having a mesh width of 80μ. When the capsule dispersion is brushed onto paper, a coating is obtained which, after storage at 80°C for 142 hours, shows no impairment.

We claim:

1. Microcapsules of which the wall material consists of a copolymer of:
   A. from 20 to 50 percent by weight of methyl methacrylate,
   B. from 20 to 50 percent by weight of acetylacetates of mono(meth)acrylates of aliphatic diols of from 2 to 8 carbon atoms,
   C. from 0 to 30 percent by weight of acrylamide,
   D. 0 to 30 percent by weight of acrylic acid,
   E. from 0 to 30 percent by weight of vinyl pyrrolidone, and
   F. from 0 to 3 percent by weight of 2-sulfoethyl methacrylate; and the core substance includes a solvent or dispersing member selected from the group consisting of castor oil, sperm oil, olive oil, paraffins and waxes, chloroparaffins, chlorinated diphenyl, light naphtha, kerosene, dibutyl phthalate, tricresyl phosphate, benzene, toluene, xylene, ethylhexyl acrylate, n-butyl acrylate, t-butyl acrylate, lauryl acrylate, styrene and other hydrocarbons which are (1) soluble in methylene chloride; (2) substantially insoluble in water; and (3) less volatile than methylene chloride.

2. Microcapsules as set forth in claim 1, wherein the copolymeric wall material is cured chemically.

3. Microcapsules as set forth in claim 1 and containing reactive dyes.

* * * * *